P. R. Dawson. Metallic Hame Tug.

117994  PATENTED AUG 15 1871

Witnesses: John Becker, Wm. H. C. Smith.

Inventor: P. R. Dawson.
Per [signature] Attorneys.

UNITED STATES PATENT OFFICE.

PAUL R. DAWSON, OF BRENHAM, TEXAS.

IMPROVEMENT IN HAME-TUGS FOR HARNESS.

Specification forming part of Letters Patent No. 117,994, dated August 15, 1871.

*To all whom it may concern:*

Be it known that I, PAUL R. DAWSON, of Brenham, in the county of Washington and State of Texas, have invented a new and useful Improvement in Metallic Hame-Tug; and I do hereby declare that the following is a full, clear, and exact description thereof, which will enable others skilled in the art to make and use the same, reference being had to the accompanying drawing forming part of this specification, in which—

Figure 1:
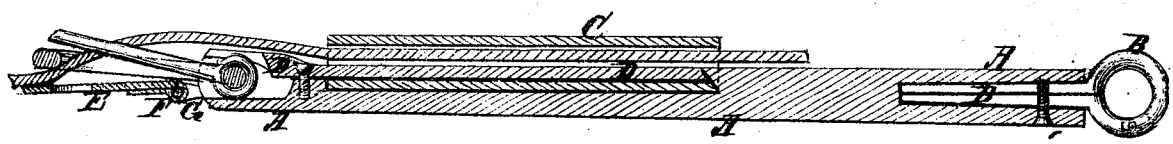
Figure 2:
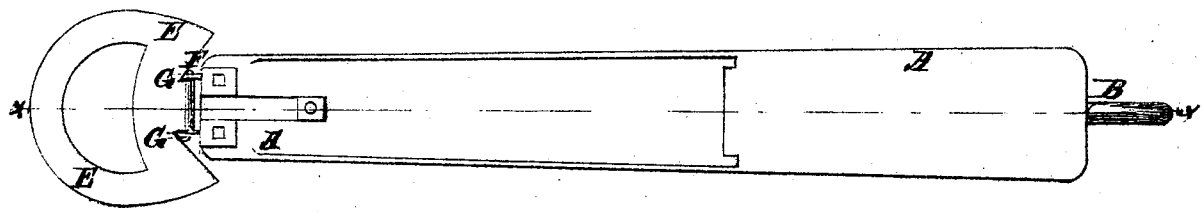
Figure 3:

Figure 1 is a detail longitudinal section of my improved hame-tug taken through the line $x\ x$ of Fig. 2. Fig. 2 is a top view of the same, the loop and locking-plate being removed. Fig. 3 is an under side of the locking-plate.

Similar letters of reference indicate corresponding parts.

My invention has for its object to furnish an improved iron hame-tug which shall be strong, durable, simple in construction, easily applied, and effective in operation; and it consists in the construction and combination of the various parts of the hame-tug, as hereinafter more fully described.

A is the main part or body of the hame-tug, in the upper end of which is formed a socket to receive the shanks of the eye B. The eye B is made with a joint, as shown in Fig. 1, so that its shanks when removed from the tug A may be spread apart for convenience in passing the said eye through the hame-eye. The eye B is secured in place in the tug A by a screw or screws, as shown in Fig. 1. In the other end of the tug A is formed a recess to receive the bar of an ordinary buckle. In the outer side of the tug A, near its buckle end, is formed a recess to receive the loop C, which is made of leather in the ordinary manner. The forward end of the loop-recess is inclined inward or beveled, as shown in Fig. 1. D is the lock-plate, the forward end of which is beveled, as shown in Fig. 1, to fit into the beveled or inclined end of the loop-recess. The rearward part of the lock-plate D is secured to the body A of the tug by a screw or screws, as shown in Fig. 1, the forward end of said plate being sufficiently secured by the bevels hereinbefore described. The rear end of the lock-plate D is notched or slotted to allow the buckle-tongue to play, passes over the bar of the buckle, and has projections formed upon its lower side to enter recesses in the projections of the body or tug A, against which the buckle-bar rests, and thus strengthens the tug against draft strain upon said buckle. E is the buckle-guard or safe placed beneath the buckle to prevent it from chafing the horse. The said guard is pivoted and secured to the rear end of of the hame-tug A by a small rod, wire, or screw, F, which passes through eyes or lugs G attached to or formed upon the rear end of the tug A, as shown in Figs. 1 and 2.

Having thus described my invention, I claim as new and desire to secure by Letters Patent—

1. An improved metallic hame-tug, consisting of the body A, detachable jointed eye B, and lock-plate D, said parts being constructed and operating substantially as herein shown and described, and for the purpose set forth.

2. The pivoted guard E, rod F, and lugs G, arranged as described and applied to the rear end of tug A, as and for the purpose specified.

PAUL R. DAWSON.

Witnesses:
JOE RALSTEN,
W. H. McCALESTER.